US012385622B1

(12) United States Patent
Li

(10) Patent No.: US 12,385,622 B1
(45) Date of Patent: Aug. 12, 2025

(54) WIRE-EMBEDDING LED BULB

(71) Applicant: TAIZHOU WANCHANG ELECTRONIC TECHNOLOGY CO., LTD., Taizhou (CN)

(72) Inventor: Jichang Li, Yichun (CN)

(73) Assignee: TAIZHOU WANCHANG ELECTRONIC TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 18/884,915

(22) Filed: Sep. 13, 2024

(30) Foreign Application Priority Data

Apr. 15, 2024 (CN) ......................... 202420766372.4
Apr. 15, 2024 (CN) ......................... 202420775029.6

(51) Int. Cl.

| | |
|---|---|
| ***F21K 9/232*** | (2016.01) |
| ***F21S 4/10*** | (2016.01) |
| ***F21V 3/02*** | (2006.01) |
| ***F21V 7/00*** | (2006.01) |
| ***F21V 7/28*** | (2018.01) |
| ***F21V 17/10*** | (2006.01) |
| ***F21V 17/16*** | (2006.01) |
| ***F21V 21/08*** | (2006.01) |
| *F21Y 103/10* | (2016.01) |
| *F21Y 115/10* | (2016.01) |

(52) U.S. Cl.
CPC .................. *F21V 3/02* (2013.01); *F21S 4/10* (2016.01); *F21V 17/16* (2013.01); *F21V 21/08* (2013.01); *F21Y 2115/10* (2016.08)

(58) Field of Classification Search
CPC .. F21V 3/02; F21V 17/16; F21V 21/08; F21S 4/10; F21Y 2215/10
See application file for complete search history.

(56) References Cited

U.S. PATENT DOCUMENTS

| | | | | |
|---|---|---|---|---|
| 11,898,706 | B2 * | 2/2024 | Athalye | F21K 9/232 |
| 2010/0283369 | A1 * | 11/2010 | Chen | F21V 29/763 313/1 |
| 2021/0108765 | A1 * | 4/2021 | Wang | F21V 29/70 |

FOREIGN PATENT DOCUMENTS

| | | | |
|---|---|---|---|
| CN | 108679470 | A | 10/2018 |
| CN | 110726076 | A | 1/2020 |
| CN | 213394855 | U | 6/2021 |
| CN | 222011690 | U * | 11/2024 |
| CN | 222011693 | U * | 11/2024 |

* cited by examiner

*Primary Examiner* — Tracie Y Green

(57) ABSTRACT

The present disclosure provides an LED (light-emitting diode) lamp and aims at providing a wire-embedding LED bulb. The key points of the technical solution are as follows: a plugging sleeve is disposed at a bottom of a lamp holder, the lamp holder and the bulb are plugged with a clamping member through the plugging sleeve, so a connecting strength between the lamp holder and the bulb is increased; meanwhile a passage through which the harness passes is formed by disposing slots and wiring holes at a joint of the lamp holder and the bulb, the harness passes through the passage and overline grooves disposed on both sides of a wire baffle and is clamped on the wire baffle, a path that the harness passes through is fixed and clamped in the wiring holes and the overline grooves to arrange and fix the harness.

9 Claims, 4 Drawing Sheets

WIRE-EMBEDDING LED BULB

CROSS-REFERENCE TO RELATED APPLICATIONS

The application claims priority to Chinese patent application No. 202420766372.4 and No. 202420775029.6, filed on Apr. 15, 2024, the entire contents of which are incorporated herein by reference.

TECHNICAL FIELD

The present disclosure relates to an LED (light-emitting diode) lamp, and in particular to a wire-embedding LED bulb.

BACKGROUND

An LED lamp (i.e., a light-emitting diode) can convert electric energy into optical energy to achieve the light-emitting demand, thus achieving a lighting function. The current LED lamps are frequently used in people's life as lighting and decorative props due to the low energy consumption, beautiful colors and capability of achieving a variety of color changes. At the same time, to increase the ornamental and practicability of the LED lamps, the LED lamps are usually connected together through electrified wires to form an LED lamp string with a chain structure.

Since more wires are connected between LED lamp beads, the LED lamp used currently is prone to winding after being powered and used, leading to a great difficulty in subsequent arrangement and difficulty stored harnesses in a bulb mounting process. Meantime, to ensure the lighting effect of the bulb, the LED lamp beads usually need to be located in the middle of the bulb, such that the light is not blocked by the base of the bulb and the brightness of the bulb is maximized; and at the same time the bulb on the market will fall and disassemble after being used for a long time due to its poor structural strength, and the whole waterproof performance is poor, thus shortening the service life of the bulb.

SUMMARY

For the deficiencies existing in the prior art, the objective of the present disclosure is to provide a wire-embedding LED bulb with convenient harness arrangement, good lighting effect, excellent waterproof performance and airtightness.

To achieve the above-mentioned objective, the present disclosure provides the following technical solution: a wire-embedding LED bulb, including a lamp holder, a bulb and a harness disposed in the lamp holder and the bulb, where a top end of the bulb is provided with a clamping member, a plugging sleeve is provided at a bottom of the lamp holder and has a shape fitting with the clamping member, two ends of the clamping member are provided with slots, the bulb is also internally provided with a wire baffle, two ends of the wire baffle are provided with overline grooves in respective, and the harness passes through the slots and the overline grooves and is clamped at the bottom of the wire baffle.

The present disclosure is further set as follows: two ends of the plugging sleeve are symmetrically provided with wiring holes, and after the clamping member is plugged with the plugging sleeve, positions of the slots match with those of the wiring holes.

The present disclosure is further set as follows: a reflective coating is disposed at the bottom of the wire baffle, and after the lamp holder is connected with the bulb, LED lamp beads on the hardness are located below the wire baffle.

The present disclosure is further set as follows: the plugging sleeve is also internally provided with a fastener, a clamping groove is provided on the clamping member and has a position fitting with that of the fastener, and a joint of the plugging sleeve and the clamping member is also provided with a rubber ring.

The present disclosure is further set as follows: the bulb is in integrated blow molding or assembly molding.

Preferably, the bulb includes a left shell and a right shell, a plurality of inserting rods are provided on the left shell, the right shell is also internally provided with a plurality of inserting slots, and positions of the inserting slots match with those of the inserting rods.

The present disclosure is further set as follows: a height of the wire baffle in the lamp holder is greater than a distance from the bottom of the lamp holder to the top end thereof.

The present disclosure is further set as follows: a distance between the overline grooves on the wire baffle is equal to that between the wiring holes.

The present disclosure is further set as follows: atop of the lamp holder is also provided with a hook.

By adopting the above-mentioned technical solution, the plugging sleeve is disposed at the bottom of the lamp holder, the lamp holder and the bulb are plugged with the clamping member through the plugging sleeve, and the fastener and the clamping groove are also provided between the plugging sleeve and the clamping member, so the connecting strength between the lamp holder and the bulb is increased; meanwhile a passage through which the harness passes is formed by disposing the slots and the wiring holes at the joint of the lamp holder and the bulb, the harness passes through the passage and the overline grooves disposed on both sides of the wire baffle and is clamped on the wire baffle, a path that the harness passes through is fixed and clamped in the wiring holes and the overline grooves to arrange and fix the harness, thus effectively preventing the harness winding; and the positions of the lamp beads in the bulb are lifted through the wire baffle, to prevent the light of the lamp beads from being blocked, thus improving the overall lighting effect.

Further, in order to improve the lighting effect of the bulb, the reflective coating is disposed at the bottom of the wire baffle, meanwhile the LED lamp beads on the harness are disposed below the wire baffle after the installation of the bulb is completed, when the LED lamp beads emit light, the lamp emitted to the wire baffle above the LED lamp beads is reflected through the reflective coating, such that the light collects and scatters outward, and the overall brightness is improved; and at the same time the height of the wire baffle in the lamp holder is greater than the distance from the bottom of the lamp holder to the top end thereof, such that the LED lamp beads on the lamp string are always disposed outside the lamp holder after the completion of the installation, thus preventing the light of the lamp beads from being blocked by the lamp holder, and increasing the lighting effect.

At the same time, for ease of installing the lamp string and increasing the overall structural strength after the completion of the installation, the harness is disposed in the bulb in a '⌣' shape and passes through the overline grooves at both ends of the wire baffle, at this time two ends of the harness stretch out of the top of the bulb, pass through the slots on the bulb and extend to the outside of the bulb; the harness exposed from the top end of the bulb is pressed into the slots of the clamping member after the lamp holder is spliced with the bulb, fits with the wiring holes on the plugging sleeve to form small limiting holes, to prevent the harness movement, with convenient assembly; and the bulb is in integrated blow molding.

Compared with the spliced bulb, the blown bulb has no spliced groove, so moisture cannot enter from the side wall of the bulb, and the joint of the plugging sleeve and the clamping member is also provided with the rubber ring, which further strengthens the waterproof performance; the bulb has high degree of integration, which effectively prevents the shell from falling, making the bulb separate from the lamp holder and further increasing the structural strength; or the bulb is set as the left shell and the right shell, the lamp string can be embedded into the overline grooves of the wire baffle on the shell, with convenient installation; and meanwhile, the plurality of inserting rods are disposed in the left shell, the plurality of inserting slots are disposed in the right shell accordingly, the overall connection is convenient, and the lamp holder at the top end is fixed to the clamping member of the bulb through the fastener after the installation of the left shell and the right shell is completed, which effectively prevents the left shell and the right shell from falling, thereby improving the overall structural strength of the bulb.

Moreover, for ease of clamping the harness into the overline grooves in a process of assembly and wire embedding, the distance between the overline grooves on the wire baffle is equal to that between the wiring holes, the distance between the wiring holes is equal to the diameter of the lamp holder, and the wire baffle at least leaves a gap, from which the harness can slide transversely and separate, in the bulb. When the bulb is in integrated molding, the lamp string is twisted to a "U" shape, and the lamp string is embedded into the overline grooves of the wire baffle through the gap; and when the bulb is in split mold-opening setting, the lamp string can be embedded into the wire baffle on the shell for being assembled, with convenient installation; and meantime the lamp string can be ensured to remain stationary in the bulb, thus improving the mounting stability and using effect.

Figure 1:
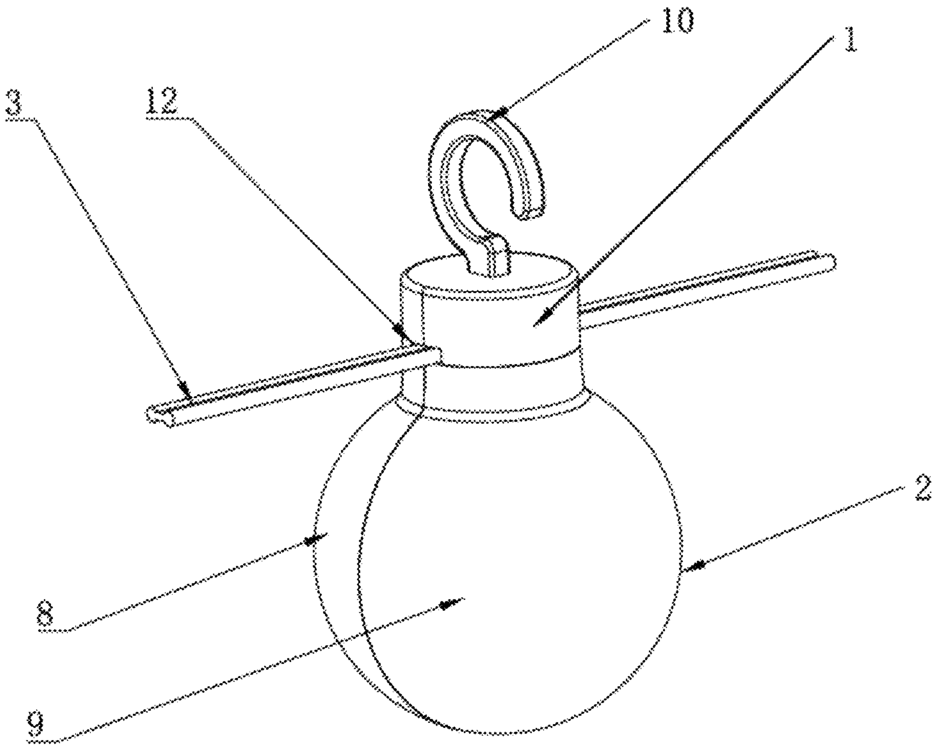
FIG. 1 is a schematic diagram of a specific structure of a wire-embedding LED bulb according to embodiments of the present disclosure.

Reference signs in the drawings: 1. Lamp holder; 11. Plugging sleeve; 12. Wiring hole; 2. Bulb; 21. Clamping member; 22. Slot; 3. Harness; 4. Wire baffle; 41. Overline groove; 42. Reflective coating; 5. Fastener; 6. Clamping groove; 7. Rubber ring; 8. Left shell; 81. Inserting rod; 9. Right shell; 91. Inserting slot; 10. Hook.

DETAILED DESCRIPTION OF THE EMBODIMENTS

Figure 2:
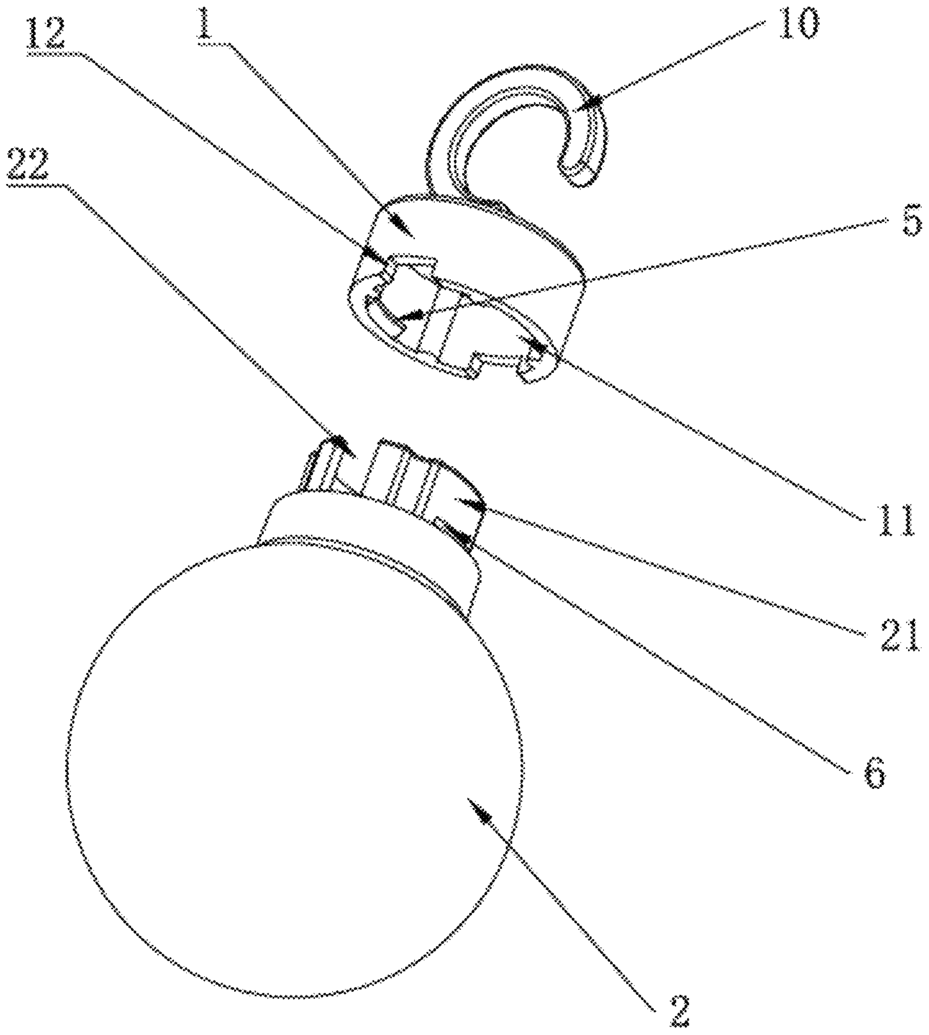
FIG. 2 is an exploded diagram of a wire-embedding LED bulb according to Embodiment I of the present disclosure.
Figure 3:
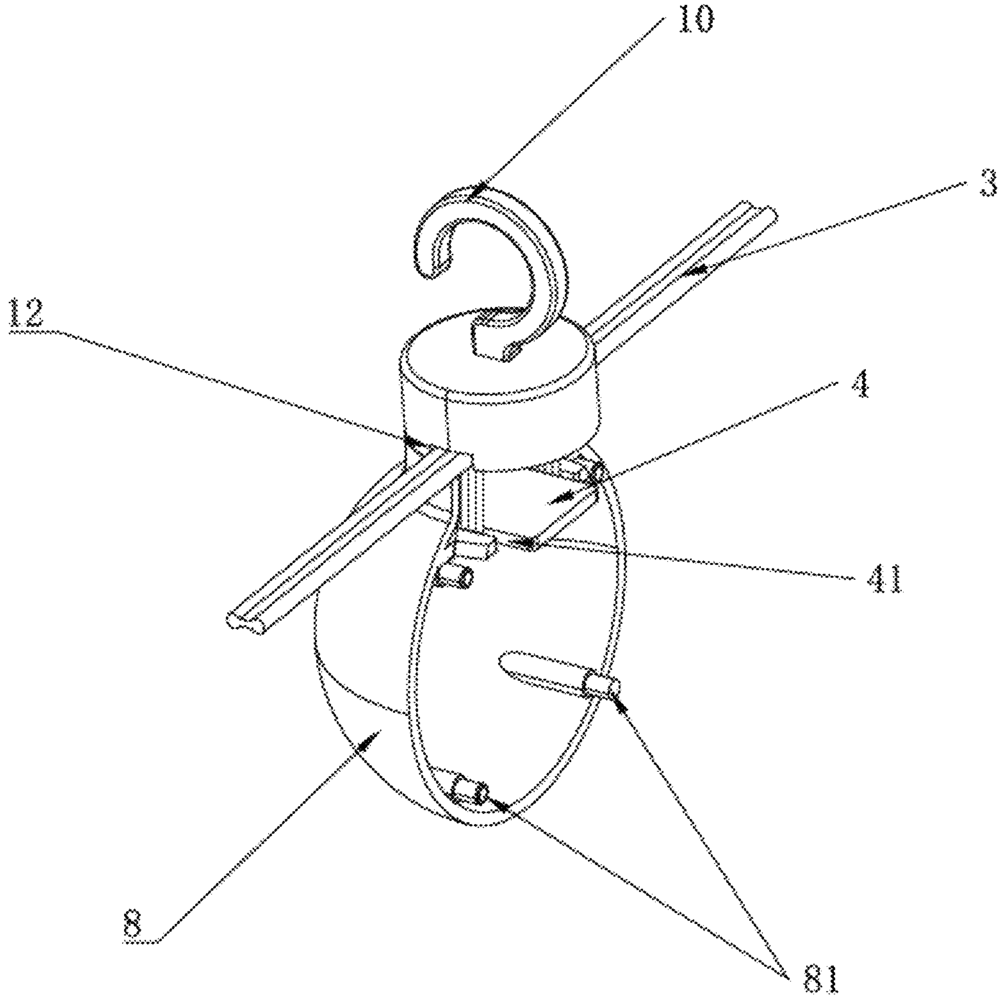
FIG. 3 is a schematic diagram of a specific structure of a wire-embedding LED bulb removing a single-side cover body according to Embodiment II of the present disclosure.
Figure 4:
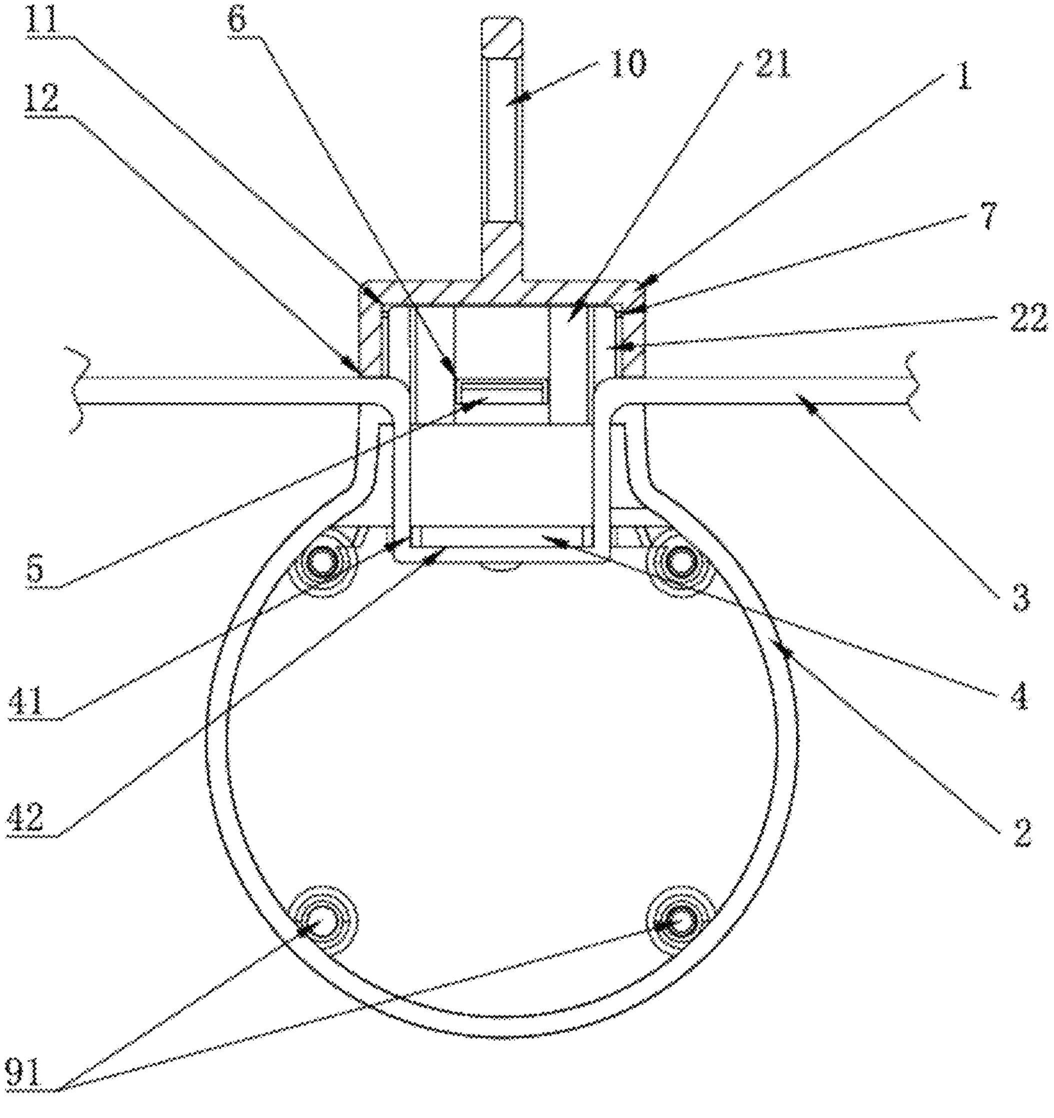
FIG. 4 is profile of a wire-embedding LED bulb according to embodiments of the present disclosure.

The embodiments of the wire-embedding LED bulb in the present disclosure is further described with reference to FIGS. 1-4.

For ease of description, spatial relative terms such as "upper", "lower", "left", "right" and the like used in embodiments are used to describe the relationship of one element or feature relative to another element or feature shown in the drawings. It is understood that, in addition to the orientation shown in the drawings, the spatial terms are intended to include different orientations of the device during use or operation. For example, if the device in the drawings are inverted, it shall be described as locating the element "below" other elements or features "above" the other elements or features. Therefore, the exemplary term "below" may include both orientations of "above" and "below". The device may be located in other ways (rotating 90 degrees or located at other orientations), and the spatial relative description used herein may be explained accordingly.

Moreover, relational terms "first", "second" and the like are merely used for separating one component from another component with the same name, rather than not necessarily requiring or implying any actual relation or sequence between these components.

Embodiment I

A wire-embedding LED bulb, including a lamp holder 1, a bulb 2 and a harness 3 disposed in the lamp holder 1 and the bulb 2, where a top end of the bulb 2 is provided with a clamping member 21, a plugging sleeve 11 is provided at a bottom of the lamp holder 1 and has a shape fitting with the clamping member 21, two ends of the clamping member 21 are provided with slots 22, the bulb 2 is also internally provided with a wire baffle, two ends of the wire baffle 4 are provided with overline grooves 41 in respective, and the harness 3 passes through the slots 22 and the overline grooves 41 and is clamped at the bottom of the wire baffle 4.

Two ends of the plugging sleeve 11 are symmetrically provided with wiring holes 12, and after the clamping member 21 is plugged with the plugging sleeve 11, positions of the slots 22 match with those of the wiring holes 12.

A reflective coating 42 is disposed at a bottom of the wire baffle 4, and after the lamp holder 1 is connected with the bulb 2, LED lamp beads on the hardness 3 are located below the wire baffle 4.

The plugging sleeve 11 is also internally provided with a fastener 5, a clamping groove 6 is provided on the clamping member 21 and has a position fitting with that of the fastener 5, and a joint of the plugging sleeve 11 and the clamping member 21 is also provided with a rubber ring 7.

The bulb 2 is in integrated blow molding.

A height of the wire baffle in the lamp holder 1 is greater than a distance from the bottom of the lamp holder 1 to the top end thereof.

A distance between the overline grooves 41 on the wire baffle 4 is equal to that between the wiring holes 12.

Atop of the lamp holder 1 is also provided with a hook 10.

The plugging sleeve 11 is disposed at the bottom of the lamp holder 1, the lamp holder 1 and the bulb 2 are plugged with the clamping member 21 through the plugging sleeve 11, and the fastener 5 and the clamping groove 6 are also provided between the plugging sleeve 11 and the clamping member 21, so the connecting strength between the lamp holder 1 and the bulb 2 is increased; meanwhile a passage through which the harness 3 passes is formed by disposing the slots 22 and the wiring holes 12 at the joint of the lamp holder land the bulb 2, the harness 3 passes through the passage and the overline grooves 41 disposed on both sides of the wire baffle and is clamped on the wire baffle 4, a path that the harness 3 passes through is fixed and clamped in the wiring holes 12 and the overline grooves 41 to arrange and fix the harness 3, thus effectively preventing the harness 3 winding; and the positions of the lamp beads in the bulb 2 are lifted through the wire baffle 4, to prevent the light of the lamp beads from being blocked, thus improving the overall lighting effect.

In order to improve the lighting effect of the bulb 2, the reflective coating 42 is disposed at the bottom of the wire baffle 4, meanwhile the LED lamp beads on the harness 3 are disposed below the wire baffle 4 after the installation of the bulb 2 is completed, when the LED lamp beads emit light, the lamp emitted to the wire baffle 4 above the LED lamp beads is reflected through the reflective coating 2, such that the light collects and scatters outward, and the overall brightness is improved; and at the same time the height of the wire baffle 4 in the lamp holder 1 is greater than the distance from the bottom of the lamp holder 1 to the top end thereof, such that the LED lamp beads on the lamp string are always disposed outside the lamp holder 1 after the completion of the installation, thus preventing the light of the lamp beads from being blocked by the lamp holder 1, and increasing the lighting effect.

At the same time, for ease of installing the lamp string and increasing the overall structural strength after the completion of the installation, the harness 3 is disposed in the bulb 2 in a "⌣" shape and passes through the overline grooves 41 at both ends of the wire baffle 4, at this time two ends of the harness 3 stretch out of the top of the bulb 2, pass through the slots 22 on the bulb 2 and extend to the outside of the bulb 2; the harness 3 exposed from the top end of the bulb 2 is pressed into the slots 22 of the clamping member 21 after the lamp holder 1 is spliced with the bulb 2, fits with the wiring holes 12 on the plugging sleeve 11 to form small limiting holes, to prevent the harness 3 movement, with convenient assembly; and the bulb 2 is in integrated blow molding. Compared with the spliced bulb 2, the blown bulb 2 has no spliced groove, so moisture cannot enter from the side wall of the bulb 2, and the joint of the plugging sleeve 11 and the clamping member 21 is also provided with the rubber ring 7, which further strengthens the waterproof performance; and the bulb 2 has high degree of integration, which effectively prevents the shell from falling, making the bulb 2 separate from the lamp holder 1 and further increasing the structural strength.

For ease of clamping the harness 3 into the overline grooves 41 in a process of assembly and wire embedding, the distance between the overline grooves 41 on the wire baffle is equal to that between the wiring holes 12, the distance between the wiring holes 12 is equal to the diameter of the lamp holder 1, and the wire baffle 4 at least leaves a gap, from which the harness 3 can slide transversely and separate, in the bulb 2. When the bulb 2 is in integrated molding, the lamp string is twisted to a "U" shape, and the lamp string is embedded into the overline grooves 41 of the wire baffle 4 through the gap.

Embodiment II

This embodiment is basically the same as embodiment I, the only difference is that the bulb 2 is formed by assembling, a plurality of inserting rods 81 are provided on the left shell 8, the right shell 9 is also internally provided with a plurality of inserting slots 91, and positions of the inserting slots 91 match with those of the inserting rods 81.

The bulb 2 is set as the left shell 8 and the right shell 9, the lamp string can be directly embedded into the overline grooves 41 of the wire baffle 4 on the shell, with convenient installation; and meanwhile, the plurality of inserting rods 81 are disposed in the left shell 8, the plurality of inserting slots 91 are disposed in the right shell 9 accordingly, the overall connection is convenient, and the lamp holder 1 at the top end is fixed to the clamping member 21 of the bulb 2 through the fastener 5 after the installation of the left shell 8 and the right shell 9 is completed, which effectively prevents the left shell 8 and the right shell 9 from falling, thereby improving the overall structural strength of the bulb 2.

Further, when the bulb 2 is in split mold-opening setting, the lamp string can be embedded into the wire baffle 4 on the shell for being assembled, with convenient installation; and the lamp string can be ensured to remain stationary in the bulb 2, thus improving the mounting stability and using effect.

The above are only specific embodiments of the present disclosure, and not used to limit the present disclosure. Common change and replacement made by those skilled in the art during the scope of the technical solution of the present disclosure are all included in the protection scope of the present disclosure.

What is claimed is:

1. A wire-embedding LED (light-emitting diode) bulb, comprising a lamp holder (1), a bulb (2) and a harness (3) disposed in the lamp holder (1) and the bulb (2), wherein a top end of the bulb (2) is provided with a clamping member (21), a plugging sleeve (11) is provided at a bottom of the lamp holder (1) and has a shape fitting with the clamping member (21), two ends of the clamping member (21) are symmetrically provided with slots (22), the bulb (2) is also internally provided with a wire baffle (4), two ends of the wire baffle are provided with overline grooves (41) in respective, and the harness (3) passes through the slots (22) and the overline grooves (41) and is clamped at a bottom of the wire baffle (4).

2. The wire-embedding LED bulb according to claim 1, wherein two ends of the plugging sleeve (11) are symmetrically provided with wiring holes (12), and after the clamping member (21) is plugged with the plugging sleeve (11), positions of the slots (22) match with those of the wiring holes (12).

3. The wire-embedding LED bulb according to claim 1, wherein a reflective coating (42) is disposed at the bottom of the wire baffle (4), and after the lamp holder (1) is connected with the bulb (2), LED lamp beads on the hardness (3) are located below the wire baffle (4).

4. The wire-embedding LED bulb according to claim 1, wherein the plugging sleeve (11) is also internally provided with a fastener (5), a clamping groove (6) is provided on the clamping member (21) and has a position fitting with that of the fastener (5), and a joint of the plugging sleeve (11) and the clamping member (21) is also provided with a rubber ring (7).

5. The wire-embedding LED bulb according to claim 1, wherein the bulb (2) is in integrated blow molding or assembly molding.

6. The wire-embedding LED bulb according to claim 5, wherein the bulb (2) comprises a left shell (8) and a right shell (9), a plurality of inserting rods (81) are provided on the left shell (8), the right shell (9) is also internally provided with a plurality of inserting slots (91), and positions of the inserting slots (91) match with those of the inserting rods (81).

7. The wire-embedding LED bulb according to claim 1, wherein a height of the wire baffle in the lamp holder (1) is greater than a distance from the bottom of the lamp holder (1) to the top end thereof.

8. The wire-embedding LED bulb according to claim 1, wherein a distance between the overline grooves (41) on the wire baffle (4) is equal to that between the wiring holes (12).

9. The wire-embedding LED bulb according to claim 1, wherein a top of the lamp holder (1) is also provided with a hook (10).

* * * * *